United States Patent [19]

Eppe et al.

[11] 3,880,521

[45] Apr. 29, 1975

[54] DOCUMENT PRESENTATION DEVICE FOR USE WITH COPYING MACHINES

[75] Inventors: Rudolf Eppe, Taufkirchen; Günther Schnall, Eching; Helmut Hösselbarth, Herford; Heinz Schiffl, Munich, all of Germany

[73] Assignee: Agfa-Gevaert Aktiengesellschaft, Leverkusen, Germany

[22] Filed: Sept. 12, 1973

[21] Appl. No.: 396,458

[30] Foreign Application Priority Data

Sept. 13, 1972 Germany.......................... 2244961

[52] U.S. Cl. ................... 355/40; 355/64; 355/75
[51] Int. Cl. ............................................. G03b 27/46
[58] Field of Search ............ 355/19, 39, 40, 46, 75, 355/64; 354/109

[56] References Cited
UNITED STATES PATENTS

| | | | |
|---|---|---|---|
| 1,907,253 | 5/1933 | Debrie | 355/39 |
| 2,153,212 | 4/1939 | Spray | 355/39 X |
| 3,480,965 | 11/1969 | Zoppoth et al. | 354/109 X |
| 3,612,684 | 10/1971 | Jones | 355/40 |
| 3,677,146 | 7/1972 | Nielsen | 355/39 X |
| 3,696,717 | 10/1972 | Honma et al. | 355/40 X |
| 3,750,553 | 8/1973 | Pfeifer et al. | 355/40 X |

Primary Examiner—Richard A. Wintercorn
Attorney, Agent, or Firm—Michael S. Striker

[57] ABSTRACT

A document presentation device which can place a series of preselected overlays into register with an original document and with the copying aperture of a document reproducing machine. The overlays form a web and are arranged in two groups separated from each other by an empty field which registers with the aperture when the machine is to make prints without images of overlays. The overlays of one group represent the first sheets and the overlays of the second group represent the second sheets of two-sheet invoices, reminders, acknowledgments or the like. The operation is automatic as regards the sequence of moving selected overlays into register with the aperture, making a desired number of prints from selected overlays, counting the number of finished prints, resetting the empty field of the web into register with the aperture upon completion of printing from a sequence of overlays, and indicating the extent of completion of a sequence of selected copying operations.

10 Claims, 4 Drawing Figures

DOCUMENT PRESENTATION DEVICE FOR USE WITH COPYING MACHINES

BACKGROUND OF THE INVENTION

The present invention relates to improvements in document copying or reproducing machines in general, and more particularly to improvements in copying machines of the type wherein copy sheets or prints can be provided with composite images including a portion of or the entire image of an original document and the image of a date-bearing overlay which may but need obscure portions of the image of the original document. Such copy sheets are desirable in the making of invoices, bills of loading, reminders, confirmations of orders or the like. For example, by using various overlays with an original document which contains information representing the quantity, nature, code numbers, cost and/or other data pertaining to an order by a particular customer, one can send to the customer first a confirmation of the order, thereupon a dispatch note, then an invoice, and (if necessary) a reminder that the payment is overdue. Copying machines which can be used for analogous purposes are disclosed, for example, in U.S. Pat. Nos. 3,493,301 to Sable et al., 3,544,212 to Umahashi et al., and 3,642,370, to Meredith et al.

A drawback of presently known copying machines which utilize overlays is that their document presentation devices are not sufficiently versatile so that their operation must be supervised during many stages of the making of copy sheets with composite images including the images of selected overlays.

In many conventional copying machines, the document presentation device contains a web consisting of a series of overlays and means for placing a selected overlay of the web into register with the window or aperature at the copying station. If an attendant wishes to copy an original document seriatim with two or more different overlays, the operation of the copying machine must be observed continuously in order to make sure that a fresh overlay is placed into register with the original document as soon as the machine has completed the printing of a desired number of copy sheets from the original document and the preceding overlay. Constant supervision of the operation is monotonous and boring, especially if the attendant must be present during the making of a large number of copy sheets from several original documents each in combination with one, two or more overlays. Therefore, the attendant is likely to make mistakes, especially if the number of copy sheets varies from original to original and/or from a combination of the original with a first overlay to a combinationn of the same original or a different original with the next overlay. Thus, on the one hand, the supervision requires concentration and, on the other hand, the making of a large number of copy sheets is a monotonous work which ties down the attendant for extended periods of time.

SUMMARY OF THE INVENTION

An object of the invention is to provide a copying machine which can be used with a document presentation device having a series of overlays, and whose operation is automated to such an extent that a single attendant can supervise an entire battery of copying machines or a single copying machine together with other types of machines without affecting the quality of the copy sheets.

Another object of the invention is to provide a novel and improved control apparatus for a copying machine which is designed to make copy sheets from combinations of original documents and selected overlays.

A further object of the invention is to provide a control apparatus which enables the copying machine having a document presentation device to perform automatically one, two or more such operations which must be initiated and/or terminated by an attendant in presently known copying machines.

An additional object of the invention is to provide a document presentation device and a control apparatus which can be installed in or combined with known types of copying machines.

Another object of the invention is to provide a document presentation device which can repeat a sequence of copying operations with selected overlays as often as desired.

Still another object of the invention is to provide a document presentation device whose controls are sufficiently simple to be actuatable by semiskilled or unskilled persons with a minimum of training in manipulation of the reproducing machine.

The invention is embodied in a document presentation device for use with a document copying or reproducing machine having a copying aperture or window over which an original document to be reproduced is placed. The device comprises means for supporting an original document in register with the copying aperture, a plurality of overlays including several groups of overlays wherein each overlay of one group is related to an overlay of another group, drive means for moving selected overlays into register with the copying aperture so that the images of such overlays can be reproduced on copy sheets together with a portion of or the entire image of the original document, selector means (including a plurality of pushbuttons or analogous actuating elements) for determining the sequence in which successive selected overlays are moved into register with the copying aperture by the drive means, and counter means for determining in advance the number of copy sheets to be made from the original document and that overlay which registers with the copying aperture.

The overlays preferably form an elongated web and the drive means may comprise first and second reels which are connected with different ends of the web of overlays, first motor means for rotating the first reel in a direction to draw the web from the second reel, and second motor means for rotating the second reel in a direction to draw the web of overlays from the first reel.

The web of overlays preferably includes an empty field between two groups of overlays. The arrangement is preferably such that the empty field automatically moves into register with the copying aperture when the making of a sequence of copy sheets from an original document and selected overlays is completed. This renders it possible to normally utilize the machine for the making of copy sheets from original documents without reproducing the overlays.

The novel features which are considered as characteristic of the invention are set forth in particular in the appended claims. The improved document presentation device itself, however, both as to its construction and its mode of operation, together with additional features and advantages thereof, will be best understood

DESCRIPTION OF THE PREFERRED EMBODIMENTS

Figure 2:
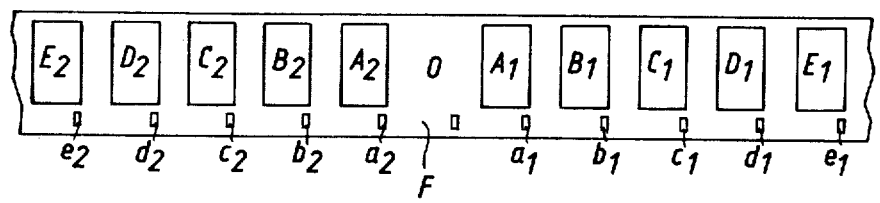
FIG. 2 is a fragmentary plan view of a web of overlays in the device of FIG. 1.
Figure 1:
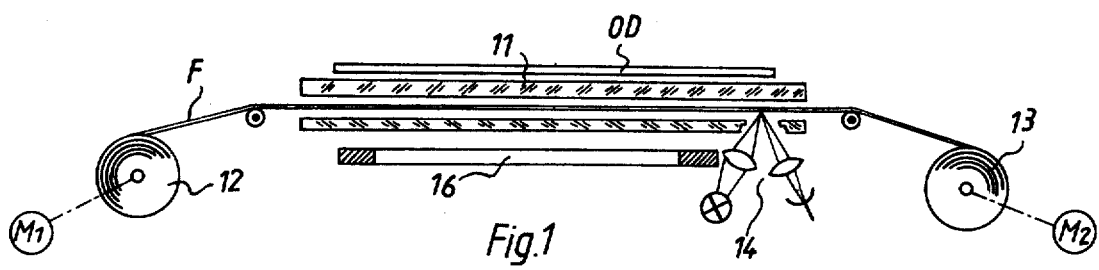
FIG. 1 is a schematic side elevational view of a document presentation device which embodies the invention.
Figure 4:
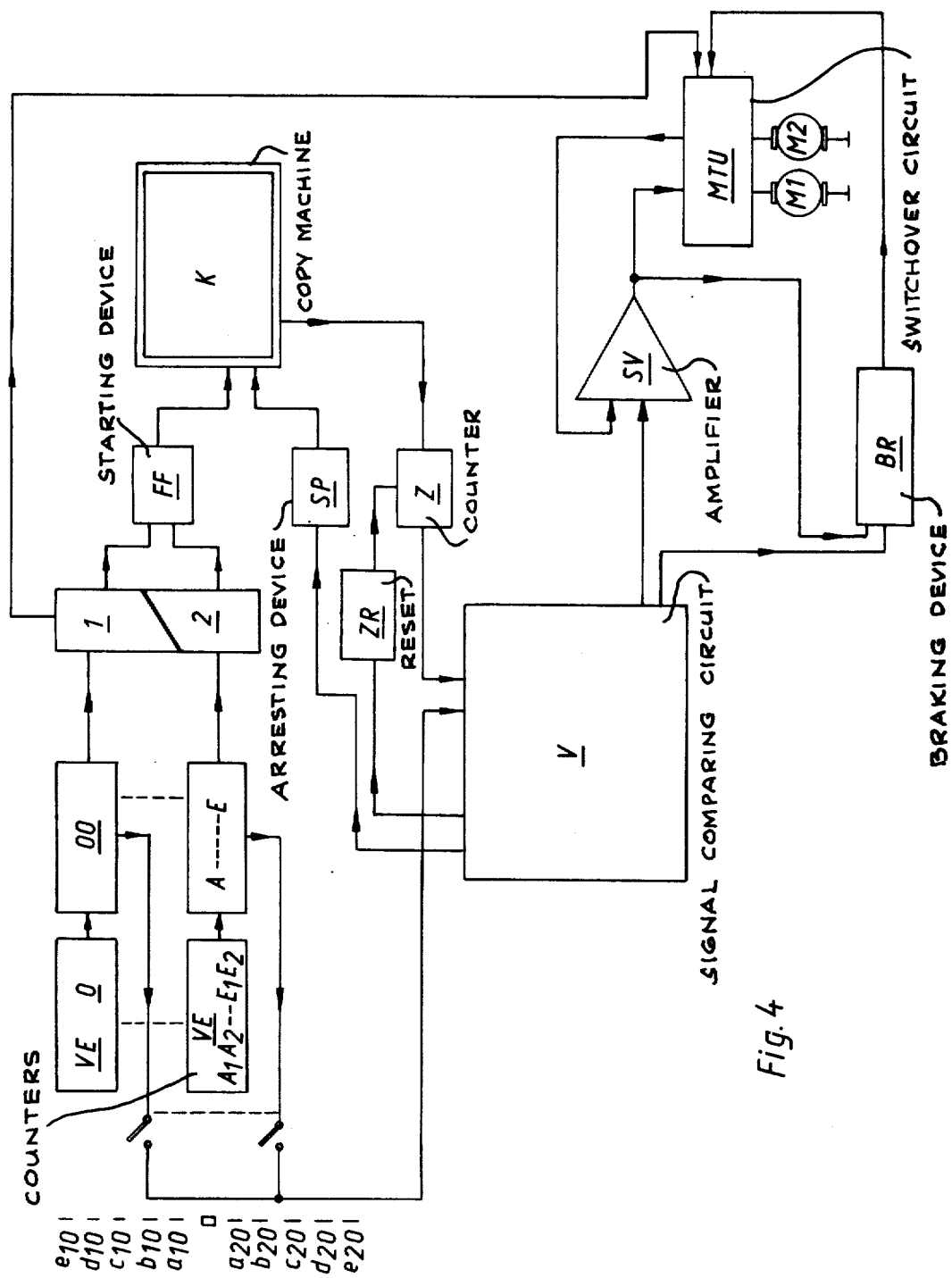
FIG. 4 is a diagram of the copying machine and of the control apparatus for the document presentation device.

FIG. 1 illustrates a document presentation device which can be used in or with a document reproducing or copying machine K shown schematically in FIG. 4. The device comprises a web F of overlays A1, B1, C1, D1, E1, and A2, B2, C2, D2, E2, (see also FIG. 2) which flank an empty frame 0. The web F is a transparent film and each of the overlays A1–E1 and A2–E2 is assumed to include a number of opaque symbols together constituting a letterhead (first sheet) and a second sheet of an invoice, bill of loading, reminder or the like. The information which is to be reproduced simultaneously with a selected overlay is stored on an original document OD which is placed onto a transparent support 11 above the path of the web F. The latter is stored on a first reel 12 and is collected by a second reel 13 or vice versa. The reels 12 and 13 are respectively driven by motors M1 and M2.

Each of the overlays A1–E1 and A1–E2 is identifiable by a discrete mark $a1, b1, c1, d1, e1, a2, b2, c2, d2, e2$ which is applied to a marginal portion of the web F. A photoelectric scanning device 14 is provided to furnish signals which indicate that a selected overlay registers with the aperture or window 16 of the copying machine K. When the document presentation device is idle, the empty frame O of the web F registers with the aperture or window 16 so that the machine K can make prints from selected originals in the customary way. If desired, the marks $a1$–$e1$ and $a2$–$e2$ can be of a type (e.g., in the form of notches) which can be detected by a mechanical scanner replacing the detector 14 of FIG. 1.

The control panel CP (FIG. 3) of the control means for the document presentation device comprises switches $a10, b10, c10, d10, e10, a20, b20, c20, d20, e20$ (FIG. 4.), one for each of the similarly numbered overlays on the web F, a pushbutton or analogous actuating element OO for the empty frame O of the web, and pushbottons A,B,C,D,E, for the groups A1–A2, B1–B2, C1–C2, D1–D2 and E1–E2 of overlays on the web F. By depressing one of the pushbuttons A–E, the attendant sets up the copying machine K for the making of copy sheets each containing the information on the selected overlay plus some or all of the information on the original document OD.

Each of the pushbuttons OO and A–E is further associated with a discrete selector VE for the number of copy sheets to be made from combinations of the original OD with selected overlays or without any overlays. Each selector VE is a counter which can be adjusted by hand or by remote control. An additional counter Z is provided to record and count the number of copy sheets which are being made from the original OD and a selected overlay of the web F. The signals from the counter Z and from that counter VE which is associated with the selected overlay of the web F are transmitted to a signal comparing circuit V which transmits a signal when the intensity of signal furnished by a selected counter VE matches the intensity of signal from the counter Z; the signal from the circuit V can be used to arrest the copying machine K and to return the plank frame O of the web F into register with the window or aperture 16 at the copying station. The circuit V automatically starts the machine K when a fresh overlay is placed into register with the aperture 16.

A starter pushbutton 1 is depressed subsequent to depression of the pushbutton A,B,C,D and/or E to select the overlay A1, B1, C1, D1, or E1. The starter pushbutton 2 is depressed to select the overlay A2, B2, C2, D2, or E2 subsequent to depression of one of the buttons A–E. The pushbutton 1 or 2 actuates a starting device FF for the copying machine K. The latter produces a signal in response to completion of a copy sheet, and such signal is transmitted to the counter Z. When the number of signals received by the counter Z matches the number of copy sheets selected by one of the counters VE (i.e., by that counter VE which is associated with the overlay registering with the aperture or window 16 of the machine K), the counter Z causes a conventional circuit to produce a reference voltage pulse which is transmitted to an amplifier SV. The latter initiates the transport of the web F so that the next selected overlay moves into register with the window 16 of the machine K. The motors M1 and M2 for the reels 12, 13 are preferably designed to transport the web F first at a relatively high speed (e.g., 0.5 meters per second) and thereupon at a relatively low speed (e.g., about 0.1 meters per second). The web F is arrested when the detector 14 detects the corresponding mark ($a1 \ldots e2$).

The motors M1 and M2 for the reels 12, 13 respectively act to advance the web F from the reel 13 toward the reel 12 and vice versa, and also as tachometer generators. Thus, when the motor M1 drives the reel 12, the motor M2 acts as a tachometer generator, and vice versa. An electrically operated braking device BR is provided to brake the motor M1 or M2 during deceleration from the higher speed to the lower speed as well as during deceleration from lower speed to zero speed. The means for selecting that one of the motors M1 and M2 which is to drive the respective reel 12 or 13 includes a switchover circuit MTU.

The reference character ZR denotes in FIG. 4 a resetting device which resets the counter Z to zero when the motor M1 or M2 transports the web F. At the same time, the copying machine K is held at a standstill by a blocking or arresting device SP.

If the attendant has depressed the buttons A,B and E, the motor M1 or M2 automatically places the overlay B into register with the window 16 of the machine K as soon as the latter has completed the making of copy sheets from an original document OD and the overlay A1. The overlays C1, and D1 are skipped because the attendant did not depress the buttons C and D. The motor M1 or M2 automatically returns the empty field O of the web F into register with the window 16 in response to completion of the last copy sheet.

If the attendant thereupon depresses the button 2, the copying machine K proceeds with the making of copy sheets from an original OD and one or more overlays A2–E2. The setting of counters VE remains unchanged so that the number of copy sheets made from an original and one of the overlays A2–E2 equals the number of copy sheets made from the original and the corresponding overlay A1, B1, C1, D1 or E1. This reduces the likelihood of mistakes because the number of copy sheets bearing the image of, say, the overlay A, normally should equal the number of copy sheets bearing the image of the overlay A2. At the same time, such dual function of each counter VE saves time because the counters VE need not be reset upon completion of making of copy sheets with the image of the overlay A1, B1, C1, D1, or E1 provided, of course, that the attendant wishes to make the same number of copy sheets with images of "primary" overlays A1–E1 and with images of "secondary" overlays A2–E2. The utilization of the improved document presentation device is of particular advantage for the making of a wide variety of sets of copy sheets each of which consists of two discrete sheets. As mentioned before, a set of two copy sheets may constitute a two-sheet invoice wherein the list of items sold starts on page one and is continued on the second page, a two-sheet bill of loading, a two-sheet reminder for payment of an overdue invoice, a two-sheet acknowledgment of an order, a two-sheet circular letter, and others.

Figure 3:
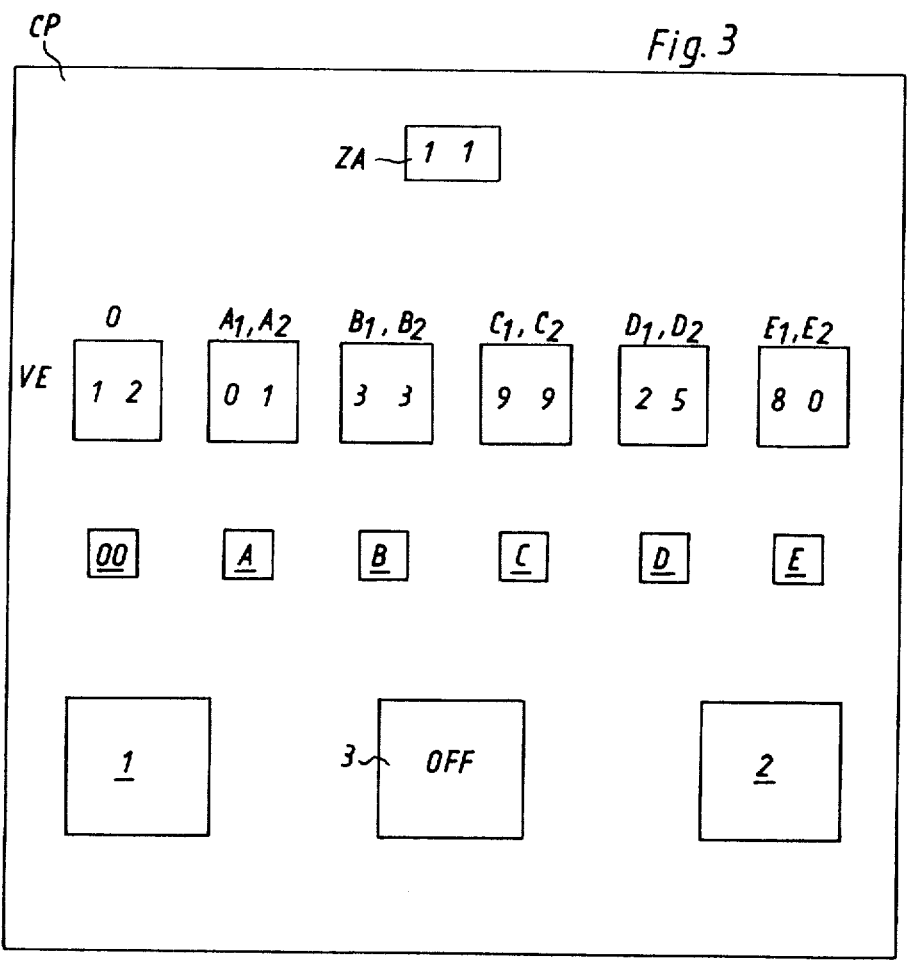
FIG. 3 is a plan view of the control panel in the copying machine which embodies the device of FIG. 1.

An advantage of the control system of FIGS. 3 and 4 is that a single attendant can supervise the operation of several copying machines. It is perferred to provide in or below or adjacent to each pushbutton on the control panel a signal lamp which lights up when the corresponding overlay is in register with the window 16 of the copying machine K. This enables the attendant to estimate the length of the interval during which the machine K is expected to proceed with the making of copy sheets. The task of the attendant in estimating the length of such interval is further facilitated by the provision of a counter ZA which indicates the number of copy sheets already prepared from an original document OD and that overlay which is in register with the window of the copying machine K, i.e., the extent to which a selected sequence of copying operations is already completed. Thus, the operator can determine at a glance whether or not the copying machine is to make a large or a small number of additional copy sheets; this enables the attendant to estimate whether or not he has sufficient time at his disposal to program one or more idle copying machines, to remove the output of arrested machine(s) and/or to perform one or more other tasks prior to returning to a running copy machine.

The reference character 3 denotes in FIG. 3 an "OFF" switch which is actuated when an attendant wishes to stop the machine K independently of the circuit V.

The web F is furnished by a photographic laboratory and is replaced by a different web when the machine K is to make copy sheets from original documents and a different series of overlays.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claim.

What is claimed as new and desired to be protected by Letters Patent is set forth in the appended claims:

1. A document presentation device for use with a document reproducing machine having a copying aperture over which an original document to be reproduced is placed, comprising means for supporting an original document in register with the copying aperture; a plurality of overlays including several groups of overlays wherein each overlay of one group is related to an overlay of another group; drive means for moving selected overlays into register with the copying aperture; selector means actuatable to select the sequence in which successive selected overlays of a group are moved into register with the copying aperture by said drive means; and counter means for determining the number of copy sheets to be made from the original document and that overlay which registers with the copying aperture.

2. A device as defined in claim 1, wherein said overlays together form an elongated web and said drive means comprises first and second reels each connected with a different end of said web, first motor means for rotating said first reel in a direction to draw the web from the second reel, and second motor means for rotating said second reel in a direction to draw the web from said first reel.

3. A device as defined in claim 2, wherein said selector means comprises discrete actuating elements for each overlay of one of said groups.

4. A device as defined in claim 2, wherein said web includes an empty field between said one group and said other group of overlays.

5. A device as defined in claim 4, wherein the overlays of said one group constitute the masters of the first sheets of sets of two copy sheets each and the overlays of said other group constitute the masters of the second sheets of the respective sets of two copy sheets each.

6. A device as defined in claim 4, wherein said selector means comprises a discrete actuating element for each overlay of said one group and the related overlay of said other group.

7. A device as defined in claim 6, further comprising discrete first and second starter means for said machine, one of said starter means being arranged to start said machine where said aperture registers with the first selected overlay of said one group and the other of said starter means being arranged to start said machine when said aperture registers with the first selected overlay of said other group.

8. A device as defined in claim 1, further comprising additional counter means arranged to record the number of copy sheets produced by said machine from an original document and the overlay which registers with said aperture.

9. A device as defined in claim 8, further comprising means for comparing the number of copy sheets recorded by said additional counter means with the number of copy sheets selected by said first mentioned counter means for the overlay which registers with said aperture and for arresting said machine when the recorded number of copy sheets matches the selected number.

10. A device as defined in claim 1, further comprising means for indicating the extent of completion of a selected sequence of copying operations.

* * * * *